UNITED STATES PATENT OFFICE.

ANANT M. GURJAR, OF ST. PAUL, MINNESOTA.

WHOLE-RICE FOOD AND PROCESS OF PRODUCING THE SAME.

1,377,125.  Specification of Letters Patent.  Patented May 3, 1921.

No Drawing.  Application filed December 9, 1918. Serial No. 266,010.

*To all whom it may concern:*

Be it known that I, ANANT M. GURJAR, agricultural chemist, native of India, subject of Great Britain, temporarily residing at the Minnesota College of Agriculture, St. Paul, in the county of Ramsey and State of Minnesota, have invented certain new and useful Whole-Rice Food and Processes of Producing the Same; and I do hereby declare the following to be a full, clear, and exact description of the invention, such as will enable others skilled in the art to which it appertains to make and use the same.

The general object of my invention is to extend the utilization of rice as a human food. The preservation of the natural nutritive substances in the rice grain and the positive simplicity and economy of its manufacture into human food being the chief results of my invention, herein disclosed, which includes a new product made from pure, whole rice and a new process of producing the same, depending upon facts discovered my me.

The product in question is a stable, ready-to-eat whole rice food, especially characterized by the presence of all of the food elements of the original rice kernel, cooked and freed from hulls. This product is made directly from unhulled field rice, the so-called "paddy". The customary milling operations hitherto employed are totally done away with by my invention.

The process, briefly stated, consists in first roasting the paddy when in a moist condition; the kernels are thereby cooked under the internally generated steam pressure developed from the moisture and held by the hulls; the latter, at the same time, are thoroughly calcined by the direct contact of heat. Then, secondly, the roasted swollen and ready-to-burst-open rice grains, while still hot, are immediately subjected to compression, during which action, the dry, brittle hulls crumble off to powder; while the kernels within are coincidentally flaked. The flaked product thus retains the whole of all the original food constituents of the rice grain.

My invention, as herein set forth, discloses the following facts discovered by me:—

(1) That the rice hulls possess sufficient strength to withhold the internally generated steam long enough to cook the kernels within.

(2) That, during this length of time and at such intensity of heat, the hulls themselves become sufficiently calcined to crumble off under compressing action.

(3) That the loose, enveloping position of the hull, during the above operations, saves the kernel from any wasteful injury.

(4) That the hot doughy kernel can be concurrently so shaped as to make its separation from the powdered hull not only possible but exceedingly easy.

(5) That the peculiar nature of the process destroys all latent bacteria, enzyms, etc., so as to render the product stable.

The novel character and value of my invention can be better understood and appreciated, if we first consider the nature of the rice kernel and survey briefly its usual manufacture into a stable article of commerce.

The rice grain, as it leaves the farm thresher, is covered by a hard, silicious closed hull or pallet loosely attached to the kernel within. The weak and mellow germ or embryo, distinctly visible, is loosely attached at one apex of the hulled kernel. Directly beneath the hull, but separate from it and strongly attached to the starchy interior body of the kernel, is a light brown bran coat. This bran coat consists of seven layers, the innermost of which are the aleurone layers. The hull, furthermore, is very hygroscopic, so that the ingress of water can rapidly moisten the kernel within.

Considering the structure of rice, in relation to its nutritive elements, the grain may be divided as follows:—The germ or the embryo furnishes fats; and it is also the principal seat of vitamins according to recent researches. The bran coat yields mineral matter characteristically rich in potassium, magnesium and phosphorus. The aleurone layers give proteins, while the endosperm contains all of the carbohydrates.

The silicious rice hull is unfit, either for human or stock food. The high content of silica, in the form of calcium silicates, makes the hull unedible, but makes it capable of withstanding high temperature. This fact is made use of in my invention.

The removal of this hull from the grain has, therefore, constituted the first and fundamental process of the modern rice milling.

The high nutritive value of all the natural substances of rice can be readily inferred from modern researches on human nutrition, particularly in relation to the vitamin phenomena. The total of fats, fiber and ash are to be well sought after, in the same way as we now scientifically look upon the whole wheat flour. However, in common practice, it is known that the presence of germ and bran coat renders the rice kernel very unstable. The simply hulled or so-called "brown" or "cured" rice is very hygroscopic and undergoes the bio-chemical decomposition very rapidly, thus unfitting the same for human food. Hence, in addition to the removal of the hull, in modern milling, the germ and the bran coat are also completely removed and discarded, in order to obtain rice as a stable article of food and commerce.

More definitely, the modern milling consists of first removing the hulls by properly adjusted revolving stones; and, secondly, the bran coats are rubbed off by scouring and polishing machines. Incidental to both of these milling operations, the germs crack off, and also many of the kernels are broken. The product of the scouring machines, the so-called "uncoated rice," is subjected to further polishing, in the presence of glucose and talc, through machines called "trumbles." The bright rice of commerce receives its luster by the last means. The expression "polished rice" is used in commerce in its generic sense to denote all thoroughly scoured rice, whether coated or uncoated; technically, however, this expression is applied to the coated product. The milled rice is very stable; in fact, it is the most stable of our staple foods, while, on the other hand, the simply hulled or brown rice, due to the presence of germ and bran coats, is the most unstable.

The loss from the hitherto practised milling operations, above referred to, is very great, as may be seen, for example, by reference to Bulletin No. 330 of the U. S. Department of Agriculture, entitled "*The Milling of Rice and its Mechanical and Chemical Effects Upon the Grain*," prepared by Messrs. Wise and Broomell, and issued under date of January 8, 1916. These authors emphasize this loss in their statements appearing on page 3 and pages 14 to 29, inclusive, and summarize the same again on pages 29 and 31. The following quotations from these authors deserve particular attention.

"The rice grain from the farm is covered with a hard, silicious hull. The hulled grain contains a germ, or embryo, located near one end, and is covered with a light-brown bran coat which, when examined under microscope, is found to consist of seven layers. During the process of milling, the hulls, the germ, six of the bran layers, and a portion of the seventh are removed."

\* \* \* \* \* \* \*

"In the modern mill the brown rice from the paddy machine loses a considerable proportion of certain of its constituents in its passage through the scouring machines. There is thus removed from the brown rice about 70 per cent. of its ash, 85 per cent. of its fat or oil, 70 per cent. of its crude fiber, 10 per cent. of its protein, and 30 per cent. of its pentosans."

Furthermore, taking the per cent. of hulls as 19.2, on page 8, and a yield of 101 pounds of the total of all grades of rice from a barrel of 162 pounds of paddy, as on page 26, table 10, we see that such a barrel represents 132 pounds of hulled rice. The per cent. of edible rice, on the basis of brown or hulled rice, from these figures, is calculated to be 76. In other words, from each 100 pounds of hulled or edible rice, the present milling method discards 24 pounds in the form of bran and polish. We can calculate the loss in the form of K. Mg. and P., by means of per cent. of these elements, as given by Forbes, Beegle and Mensching, in Ohio Station Bulletin No. 255, page 229.

These authors give the figures for the per cent. of these elements as follows:

|  | Potassium, (parts per 100). | Magnesium, (parts per 100). | Phosphorus, (parts per 100). |
| --- | --- | --- | --- |
| Rice | .036 | .025 | .093 |
| Rice polish | 1.137 | .659 | 1.497 |

Calculating on this basis, we find that from each 100 pounds of brown rice, we throw away 0.27 pound of potassium, 0.15 pound of magnesium and 0.33 pound of phosphorus.

The milling loss, above stated, becomes much more significant, if we state it in terms of "fancy head" and "second head"; for it is these principal grades that are found in our actual domestic use. These two together, as seen in the same table, give 78 pounds, which makes only 59 per cent. of the hulled rice. In other words, from each 100 pounds of hulled or brown rice, the modern milling discards 41 pounds in the form of screenings and brewer's rice.

The removal of the chemical constituents, as noted above, especially the loss of fats, fiber and ash, leaves a deficient food, due to the absence of vitamins, which deficiency is known to have a causal relation to the disease of beriberi. From the elaborate investigations of beriberi, polyneuritis and their absolute cure by the vitamins contained in rice polishings, it is established that the rice germs and the bran coats are the imminent seats of vitamins, so that the loss of these, naturally leaves polished rice as a deficient food.

It was because of the above situation, in respect to the prior art, that I was led to make a careful study of rice from chemical, physiological and manufacturing standpoints, with a view, primarily, of ascertaining the possibility of removing the hulls from the field rice in such a way as to get a stable, ready-to-eat rice product, which would contain the whole of all the constituents of the original rice kernel; and further, of securing this product at a comparatively small cost.

My new process, based upon my discoveries and developed through my laborious studies, not only eliminates all the losses necessitated in the old method of milling, but it is exceedingly simple and economic.

The exact details of my practice in handling the rice may be stated as follows:—

The cleaned unhulled field rice or paddy is first dipped in boiling water, thereby removing any adherent foreign matter, and also sterilizing the grains. The unsound and immature grains which float are discarded.

The sterilized paddy is then soaked in water to saturation. At room temperature, a period of 24 hours accomplishes the necessary imbibition of water. Care is taken not to leave the paddy long enough in water for malting or fermentation to start, as no chemical predigestion is desired. The ingress of water into the grain can be accelerated by the use of very weak solution (about one per cent.) of caustic alkali or sulfurous acid. At the end of 24 hours, the moist paddy is thoroughly drained and is ready for the vital steps of the process.

The above moistening of the paddy can be accomplished, even more preferably, by the so-called "capillary contact process". This is possible because of the high permeability of the rice hull and bran coat. For doing this, the sterilized paddy is simply covered by a wet cloth, the moisture of which is renewed once or twice. This contact process avoids over-soaking of the hull, and maintains a free circulation of air in the bulk. Furthermore, no draining is required, due to the absence of any free water present in the other method of moistening.

The moist paddy is then roasted in a proper container at a suitable temperature and for a suitable time. A heat intensity of 170 degrees centigrade is found effective. In practice, the paddy is held in a meshed metallic basket kept in motion in close contact with indirect heating elements. Within a few minutes, a very characteristic odor is given off by the paddy and this becomes stronger and stronger until burning of the hull begins, which, if allowed, instantly changes the odor to that of burning fiber. The roasting is stopped before this burning begins. Concurrently with the development of the odor, the swelling of the paddy is noticeable to the eye and the roasting is ceased when a few kernels burst open.

During the roasting, the hull is sufficiently strong to retain the steam generated within the kernels of the paddy, from the moisture therein, and both the hull and the bran coat are sufficiently elastic to permit the swelling of the kernel without bursting, within a time limit long enough to accomplish the needed cooking of the kernel.

If the paddy were not properly moistened, the necessary cooking action would not be secured, for lack of sufficient steam and the roasting heat would simply burn the paddy until it would puff. The time and temperature are so adjusted that the steam will develop rapidly within the kernel of the paddy without either drying or burning the same. The success of the process, indeed, depends upon this point.

The dry and roasting heat applied to the exterior of the hulls of the paddy calcines the same, so that the latter become extremely brittle, due to the large per cent. of silica.

The roasted paddy, while hot, is then immediately subjected to a compressing action, which crumbles the calcined hulls from the kernels and, at the same time, flakes the cooked dough with all the original constituents intact, the germ being embedded in the flaked mass of the doughy material. This compressing action has been very advantageously done by means of the common experimental wheat-flour roller mill having one set of corrugated rollers and one set of smooth rollers. By passing the roasted paddy, when in a hot condition, once or twice through the set of corrugated rollers, properly adjusted, the hulls are crushed, but the kernels do not crumble on account of their doughy state. Then, by subjecting the whole mass, while still hot, to the smooth rollers, the flaking is completed and the entire hulls are completely crushed to powder.

The hot cooked kernels do not stick to the rollers, for the reason that the bran coats are all present and so cover the doughy mass that the adhesive starch passes through the rollers without sticking to the latter.

If the mill is equipped with suitable separators, such as perforated receivers kept in motion, in position to receive the heated material as it drops from the rollers, the treatment is automatically completed when the roasted paddy has passed through the smooth pair of rollers. At this point, also, the entire process is completed, for the finished product, if the mill is equipped with a system of properly heated rollers.

In the absence of such separators and heated rollers, the product from the smooth pair of rollers is cleaned, by sieving or winnowing, and then is dehydrated or toasted on hot trays, without dextrinizing. Such toasting is only in keeping with the modern popular taste.

The whole rice product thus secured is neutral in respect to taste or odor and is adapted to take any desired flavor; it is creamy white in color, brittle in texture, light in weight relative to bulk, and is stable for an indefinite period of time. Indeed, it is as stable as polished rice. On analysis, under the customary tests for percentage of notable ingredients, this finished product will be found to contain moisture 8.50; protein 8.00; fat 2.06; fiber 2.24; ash 1.60; and $P_2O_5$ .85. The remainder is chiefly carbohydrates, to wit: starch, pentosans and gums. No part of the product is dextrinized.

It should be noted, at this point, that my product, as disclosed above, is not obtainable from and my process is not applicable to the simply hulled or brown rice, due to the fact that the latter lacks protection from heat, such as offered by the hull of the paddy; and, therefore, such naked kernels inclosed in the thin bran coat, when roasted, either dry or burn and fall into granules when put through rollers.

The stability of my product is due to two controlling reasons, to wit:—(1) That the latent molds, bacteria and enzyms are destroyed by the high temperature to which the rice is repeatedly subjected; (2) The per cent. of moisture in the product is too low for any fermenting action that may be induced from external sources. This can be inferred from the recent researches on "Respiration of stored wheat" by myself and C. H. Bailey, published in *Journal of Agricultural Research*, No. 11, Volume XII, March, 1918, pages 685–713.

It is thus obvious that my invention has dispensed with all of the expensive apparatus hitherto used for milling rice, without substituting any new cumbersome machinery. The actual apparatus, used in carrying out the process, is simple and cheap to produce and commonly available at small cost. Hence, the new process economically effects a great saving of nutritive materials now being wasted. The new product is extremely stable and low in cost of production as compared with the only stable products hitherto produced from field rice, to wit: the polished rice or ready-to-eat foods sometimes prepared from the latter.

In Table I is given the chemical composition of my product showing how fully it answers the expectations. The table also contains chemical composition of various grades of milled rice, for the sake of comparison. Attention is particularly called to the items of ash, fat, fiber and phosphorus.

Table I. Comparative analysis.

|  | Unhulled rice. | Brown cured rice. | Polished rice. | Gurjar product. |
|---|---|---|---|---|
|  | (*) | (*) | (*) | (†) |
| Moisture % | 10.28 | 11.88 | 12.34 | 8.50 |
| Protein % | 7.95 | 8.02 | 7.18 | 8.00 |
| Fat % | 1.65 | 1.96 | 0.26 | 2.06 |
| Fiber % | 10.42 | 0.93 | 0.40 | 2.24 |
| Ash % | 4.09 | 1.15 | 0.46 | 1.60 |
| $P_2O_5$ % |  | 0.65 | 0.20 | .85 |

\* *Food Products*, H. C. Sherman, p. 266.
† Analysis by author.

Aside from the special qualities of my product, as above discussed, I must say a few more words regarding the vitamin feature, as may be surmised from its stated chemical composition. The subject of vitamins is yet very ill-defined and vague. It is, however, definitely established that the deficiency diseases are due to the use of milled cereals which lack vegetive portions of seeds, such as germs.

The germs or embryos and, to small extent, the bran coats are now known to be the principal carriers of vitamins. The items of ash, fat and fiber present in my product, as shown in the above table, from the standpoint of vitamins, can, therefore, hardly be overestimated. For a discussion of the vitamin content of the rice germs in rice polish, Messrs. Vedder and Williams may be referred to in their recent work, published under the title of "*Concerning the Beriberi Substances or Vitamines Contained in the Rice Polish*," Phillipp. J. Sci. Sec. B. 8, 175, 1913. The subject has been also repeatedly discussed by C. Funk, as for example, his "Is polished rice plus vitamines a complete food?" published in *Journal Physiology*, 48, 228, 1914.

I am aware that prior to my invention, there had been temporarily on the market, at various times in the past, some foods under the name "rice flakes;" but, on careful investigation, I have found that all such products, if made from rice at all, are prepared from polished rice. Evidently, none of such products contain the whole of all the original elements of the rice kernels.

The chemical composition of the old product, as analyzed by various men, is given in Table II, contrasted with my new product. It is readily noticeable that the items of fat, fiber, ash and protein of the old product closely approximate those of polished rice. None of said old products contain any of the germs and practically all of the bran is also absent. In other words, the principal carriers of vitamins are absent from all of said old products.

Table II.

| | Woods and Snyder (1), 1906. | Street (2). | | Atwater 1899 (3). | Polished rice (4). | Gurjar product. |
|---|---|---|---|---|---|---|
| | | Cook's flakes, 1909. | Kellogg's flakes, 1915. | | | |
| | Per cent. | Per cent. | Per cent. | Per cent. | Per cent. | Per cent. |
| Ash | 0.3 | 0.4 | *3.4 | 0.3 | 0.46 | 1.60 |
| Fiber | 1.2 | 0.2 | 0.2 | 0.2 | 0.40 | 2.24 |
| Fat | 0.3 | 0.1 | 0.4 | 0.4 | 0.26 | 2.06 |
| Protein | 8.3 | 7.8 | 10.00 | 7.9 | 7.18 | 8.00 |
| Water | 10.2 | 12.6 | 4.7 | 9.5 | | 8.5 |

* Due to the addition of salt.

(1) Charles D. Woods and Harry Snyder, "Cereal Breakfast Foods", Farmers' Bulletin No. 249, 1906, page 15; U. S. Dept. of Agriculture.
(2) John P. Street, "The Cereal Breakfast Foods", Conn. Station Bulletin 197, 1917, pp. 32-34.
(3) W. O. Atwater and A. P. Bryant, U. S. Office of Exp. Station Bulletin No. 28, 1899, p. 57.
(4) H. C. Sherman, "Food Products", p. 266.

So far as I have been able to ascertain, from my investigations of the prior art, I am the first or pioneer to have provided, by any means whatever, any stable cooked and ready-to-eat rice food containing substantially all of the germ and substantially all of the bran present in the original rice kernels; or, otherwise stated, I am the first or pioneer to provide any such food containing substantially all of the principal vitamin carriers of the rice; and I desire herein to claim said new product in the broadest way possible.

In the expression "whole rice food," as used in the foregoing specification, the word "whole" has its common sense meaning of substantially or practically "whole." There is, of course, a slight loss, but it is so small as to be negligible.

What I claim is:—

1. The process of producing a stable ready-to-eat rice food from unhulled field rice or paddy, which process consists in roasting the paddy when in a moist condition, thereby cooking the kernels under internally generated steam pressure retained by the hulls, and, at the same time, calcining the hulls by the dry or roasting heat applied to the exterior thereof, and then in compressing the roasted paddy, while hot, thereby removing the hulls and flaking the cooked kernels of rice.

2. The process of producing a stable ready-to-eat substantially whole rice food from unhulled field rice or paddy, which process consists in roasting the paddy when in a moist condition, thereby cooking the kernels under internally generated steam pressure retained by the hulls, and, at the same time, calcining the hulls by the dry or roasting heat applied to the exterior thereof, and then is compressing the roasted paddy, while hot, thereby removing the hulls and flaking the cooked whole kernels of rice with substantially all their original constituents present.

3. A stable cooked and ready-to-eat non-dextrinized rice food, which, in addition to the starch, is characterized by the presence of substantially all of the germ and substantially all of the bran of the original rice kernels.

4. A stable ready-to-eat substantially whole non-dextrinized, pure rice food characterized by the presence of substantially the whole of all of the elements of the original rice kernels cooked flaked and freed from hulls.

In testimony whereof I affix my signature in presence of two witnesses.

ANANT M. GURJAR.

Witnesses:
JAS. F. WILLIAMSON,
CLARA DEMAREST.